July 15, 1947.  F. W. A. KNOLL  2,423,984
WING FLAP EXTENDING MECHANISM
Filed July 12, 1943  2 Sheets-Sheet 1
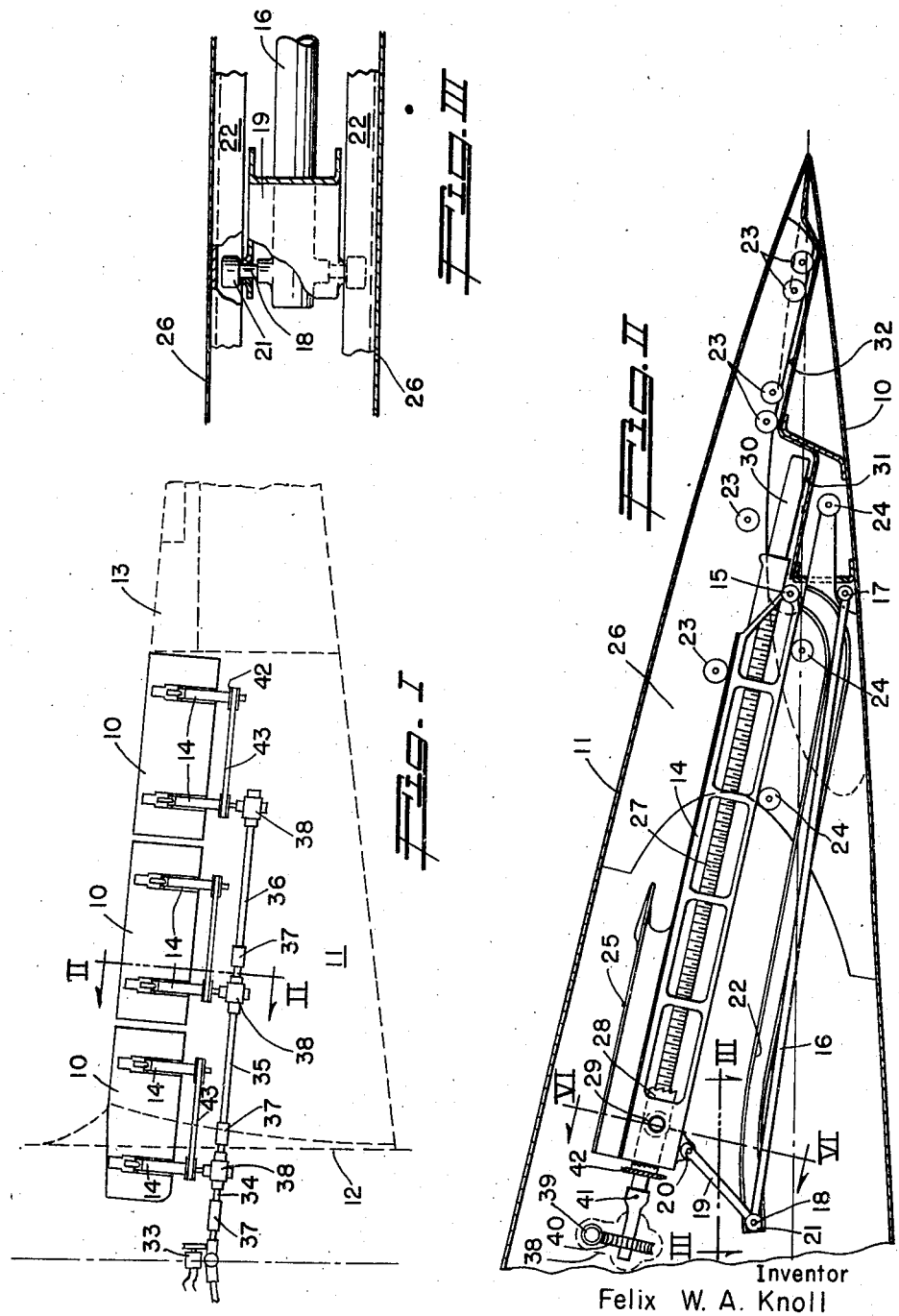
Inventor
Felix W. A. Knoll
By George C. Sullivan
Agent July 15, 1947. F. W. A. KNOLL 2,423,984
WING FLAP EXTENDING MECHANISM
Filed July 12, 1943 2 Sheets-Sheet 2
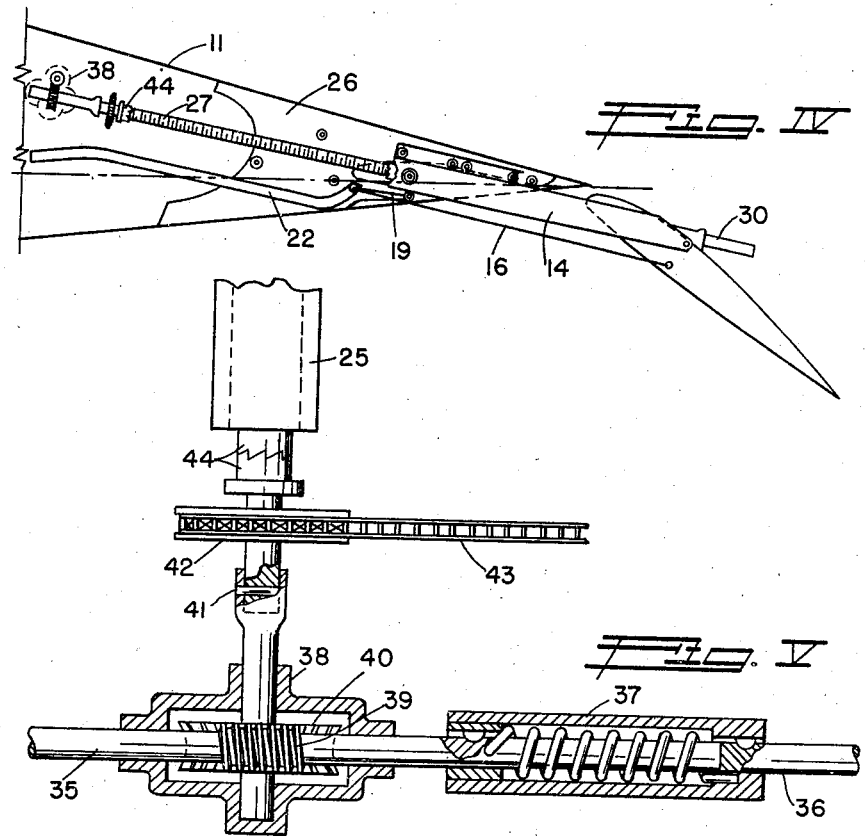
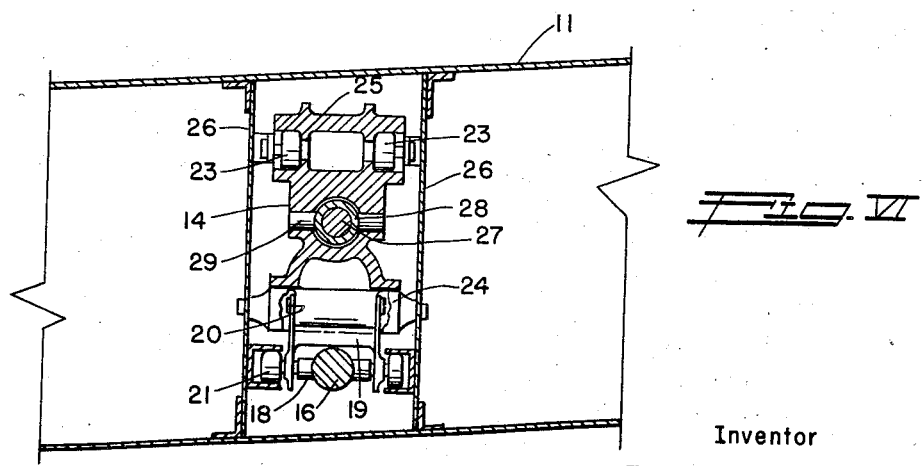
Inventor
Felix W. A. Knoll
By
*George Sullivan*
Agent Patented July 15, 1947

2,423,984

UNITED STATES PATENT OFFICE 2,423,984

WING FLAP EXTENDING MECHANISM

Felix W. A. Knoll, Los Angeles, Calif., assignor to Lockheed Aircraft Corporation, Burbank, Calif.

Application July 12, 1943, Serial No. 494,409

12 Claims. (Cl. 244—42)

This invention relates to improvements in extendible wing flaps for airplanes and provides a safety drive for a plurality of flap panels individually supported and extended or retracted from a common drive.

Extensible trailing flaps of the general type under consideration have been used heretofore, such flaps being used at partial extension to increase the wing lift, and at full extension for both increased lift and as an air brake to slow down the landing speed, while maintaining adequate lift at such reduced speed. In modern high performance airplanes some such devices are essential, since a wing section chosen for high speed performance would have excessive take-off and landing speeds, unless modified by lift increasing devices to extend the performance range thereof.

It is accordingly an object of this invention to provide an improved flap operating drive mechanism wherein the flap area is divided into a number of panels on each side of the airplane fuselage, such an arrangement being desirable in large airplanes to reduce the size and vulnerability of the flaps, especially in military airplanes wherein damage to one flap has heretofore acted to jam the entire flap operating mechanism, thus preventing the further use or control thereof, the usual result being an abandonment of the airplane rather than an attempt to land at the excessive speed necessary without flaps.

It is also an object of this invention to provide an improved and simplified flap extending and retracting mechanism for progressively starting a plurality of flaps whereby the starting or maximum load on the driving mechanism is substantially reduced. This is desirable since the static or starting friction of a series of flaps is several times the running friction after once in motion, so that the starting load on the driving train is excessive. In one case it required 16 horsepower in the driving motor to start the flaps and only 6 horsepower for the maximum load condition on the flaps when once in motion. This invention, therefore, contemplates sectionalizing the drive for a number of flaps by providing a common drive therefor through a series of flexible or torsion couplings so arranged as to progressively start the flaps in motion to thereby reduce the peak starting load on the driving motor. By so arranging the drive, the size and/or capacity of the driving motor, the airplane electric, hydraulic or compressed air system supplying energy thereto, and the weight and cost of the complete installation is materially reduced.

It is a further object of this invention to provide an improved flap extending and retracting mechanism including flap carriages arranged within the wing profile in the retracted position of the flap and guided in their outward movement in box ribs in the wing, the carriages being extended and retracted by a screw mechanism having torsion stops at either extremity of the carriage movement to prevent a wedging or jamming action due to overtravel of the screw.

Other and further important objects of this invention will be apparent from the disclosures in the specification and the accompanying drawings.

This invention, in its preferred form, is illustrated in the drawings and hereinafter more fully described.

On the drawings—

Figure I is a plan view of a multiple flap and driving arrangement embodying the features of this invention, the fuselage and wing outlines being fragmentarily shown in dotted lines.

Figure II is an enlarged fragmentary cross-section on the line II—II of Figure I to show one flap carriage and operating mechanism in elevation with the flap retracted.

Figure III is a fragmentary section taken on the line III—III of Figure II to show the guide way and roller for the flap tilting linkage.

Figure IV is a diagrammatic showing of the flap and its control mechanism in fully extended position.

Figure V is a fragmentary detail section of the common drive with a power- take-off for one flap with details of the flexible torsion coupling, frangible coupling and torsion stop.

Figure VI is a fragmentary section on the line VI—VI of Figure II showing a box rib with a flap carriage and flap tilting linkage guided therein.

As shown on the drawings—

I have chosen to illustrate my invention as applied to an airplane having its flaps 10 divided into three panels in the trailing edge of the wings 11 on each side of its fuselage 12. In a low wing design the inboard panels may conveniently be extended inwardly beneath the fuselage, as indicated in Figure I by the position of the inboard flap, since such flaps desirably utilize as much of the available trailing edge of the wing as is not required for ailerons 13. The flap panels are designed in their retracted position to nest or fair into a recess provided beneath the trailing edge of the wing, and each flap is desirably cantilever mounted on pairs of extendible carriages 14. The flaps are pivotally supported on the outboard ends of the carriages at 15, and the angle of the flaps is controlled by a distortable quadrilateral linkage comprising a rod 16 pivoted to the flap at 17 with its other end pivoted at 18 to a link 19 which is in turn pivoted to the carriage at 20. The pivot 18 between the rod 16 and link 19 is guided by rollers 21 in a curved track 22 which varies the angle of the flap as the latter is extended; to provide a dual purpose flap to aid in take-off and climb when partly extended, and to act as an air brake when fully extended prior to landing. This quadrilateral linkage control of the flap angle is more fully disclosed in the co-pending application of E. O. Richter, Serial No. 396,347, filed June 2, 1941, entitled Extendable wing flaps. The present invention is an improvement thereover in the carriage arrangement, and the driving mechanism therefor, which will now be described.

The carriage 14 slides outwardly between top and bottom rollers 23 and 24, the top rollers being duplicated on either top edge of the carriage so that as the latter approaches its extreme position, spaced overlying ledge 25 thereon overrides the rollers, to increase the rigidity of the carriage support at such extensions. The bottom rollers 24 extend from side to side of a box rib 26 as best shown in Figure VI, the duplicate tracks 22 being mounted on the walls of the rib, which encloses all of the operating mechanism for the carriage.

The carriage 14 is projected and retracted by a screw 27 engaging in a nut 28 pivoted at 29 in the inboard end of the carriage. With the carriage and flap retracted, the outboard end of the screw projects past the outboard end of the carriage and is desirably enclosed by a dust cover 30 carried by the latter. As best shown in Figure II the screw end and its cover 30 extend into a clearance pocket 31 formed therefor in the top surface of the flap, a second pocket 32 being provided for the extreme end of the box rib which supports the outboard upper rollers 23. These two clearance pockets are formed as localized dished areas in the top surface of the flap, do not appreciably affect its aerodynamic functions, and are entirely enclosed within the wing section when the flap is retracted.

As shown in Figure I a common drive for the flaps comprises a fluid or electric motor 33, deriving its energy from the airplane's hydraulic, pneumatic, or electrical system, serves to drive a lay shaft extending out the wing and comprising a series of similar short sections 34, 35 and 36 coupled to each other by torsion couplings 37. Each of the shaft sections 34, 35 and 36 extend through a worm gear box 38 and incorporate a worm 39 driving a worm gear 40 connected by a frangible shear pin coupling 41 to the screw 27 of one of the two carriages 14 which support each flap. The second carriage for each flap is in turn driven from the first or directly driven screw by means of sprockets 42 and a chain 43.

As best shown in Figures II and V, cooperating torsion stops 44 and 45 are provided for both extremes of the movement of the carriage nut 28 on the screw 27, so that a wedging action, due to overtravel of the screw, after the flap reaches its extreme positions, is prevented.

In the practical operation of extendible flaps the load thereon varies in accordance with the position of the flap relative to the wing, being greatest at the maximum extension of the flaps. However, the flaps will be used throughout their range as a partial extension thereof assists in take-off and climb, while a full extension is used for the landing approach. Thus the flap extending and retracting mechanism must be capable of starting under adverse load conditions from or at any point in the flap travel. It is well known that the starting friction in a driving train is usually several times the running friction when once in motion, and in the present case such starts must be made under adverse loading conditions that accentuate the starting friction, which coefficient may reach 20%. After starting the coefficient of friction almost instantly drops to the running coefficient of approximately 5% in a flexible structure such as an airplane wing, and as low as 2% in efficient gears. Thus the virtual operating load after the system is in operation drops to a fraction of that required to initiate the motion. In a certain case the starting load or peak output on the flap motor required 16 horsepower to start flap retraction, whereas once in motion 6 horsepower was sufficient for the maximum load condition with the flaps fully extended. Thus the extra size and weight of the driving motor was not only a serious penalty but tended to overload the power source at the very moment when other services such as wheel retraction or extension required power from the same source.

By subdividing the high speed drive shaft with a number of elastic or torsion couplings, allowing a slight lag in "picking up" the successive flap panels one after the other, the nominal or starting input of the driving unit may be held to reasonable limits, as the load curve can be flattened out. Theoretically, if the flaps on one side of the fuselage were operated as a unit as heretofore, the starting or peak load may be represented as 100%. If divided into two panels progressively picked up by a torsion coupling the peak load falls to 77%; and three panels reduces the peak load to 70%. Thus a very material advantage results from the progressive energization of successive flap panels. The resulting slight difference in phase or extent of flap movement is temporary, as the torsion couplings tend to bring the lagging flaps into synchronism since energy is stored in the couplings, and the couplings may be so proportioned as to be capable of returning this energy against the reduced friction of the moving flaps.

The safety feature involved in the subdivision of the flap area into a number of independent panels is of considerable value in military ships since damage to one flap allows it to drop out of the driving train by breakage of its shear pin, leaving the remaining flap panels free to function, rather than jamming the entire flap mechanism.

It will thus be seen that I have invented an improved multiple flap operating mechanism wherein one or more flap panels may drop out of the driving train without affecting the operation of the remaining flaps, wherein the starting load is materially reduced thus enabling the use of a smaller driving motor with a reduced drain on the airplane's power source, and wherein each flap panel is extended or retracted by a pair of spaced screw members which take the chordwise load on the flap and have a common driving connection to the driving motor to assure synchronization thereof.

Having thus described my invention and the present preferred embodiments thereof, I desire to emphasize the fact that many modifications may be resorted to in a manner limited only by a just interpretation of the following claims.

I claim:

1. In an airplane, a main wing having a series of pockets therein to receive flaps, a series of extendible wing flaps normally fitting into said pockets and fairing into the profile of the main wing, said flaps being substantially aligned and occupying a major portion of the trailing edge of said wing, and driving means for extending and tilting said flaps relative to said wing comprising a pair of carriages for each flap, guide means carried by said wing for supporting said carriages, and a common drive mechanism for extending and retracting one of each of said pairs of carriages for each flap, including individual power take-offs and carriage driving means for one of each pair of said carriages, said power take-offs including frangible connections to said carriage driving means whereby damage or jamming of one flap will not jam the operation of the remaining flaps, and means for driving the other carriage of each pair from the driven carriage.

2. In an airplane, a main wing having a series of pockets therein to receive flaps, a series of extendible wing flaps normally fitting into said pockets and fairing into the profile of the main wing, said flaps being substantially aligned and occupying a major portion of the trailing edge of said wing, and driving means for extending and tilting said flaps relative to said wing comprising at least one independently extensible carriage for each flap, guide means carried by said wing for supporting said carriages, and a common drive mechanism for extending and retracting said carriages and flaps, including individual power take-offs and carriage driving means for each of said carriages, said power take-offs including frangible connections to said carriage driving means whereby damage or jamming of one flap will not jam the operation of the remaining flaps, and flexible couplings in said common drive mechanism between each of said individual power take-offs.

3. In an airplane, a main wing having a series of pockets therein to receive flaps, a series of extendible wing flaps normally fitting into said pockets and fairing into the profile of the main wing, said flaps being substantially aligned and occupying a major portion of the trailing edge of said wing, and driving means for extending and tilting said flaps relative to said wing comprising a pair of carriages for each flap, guide means carried by said wing for supporting said carriages, and a common drive mechanism for extending and retracting one of each of said pairs of carriages for each flap, including individual power take-offs and carriage driving means for one of each pair of said carriages, said power take-offs including frangible connections to said carriage driving means whereby damage or jamming of one flap will not jam the operation of the remaining flaps, means for driving the other carriage of each pair from the driven carriage, and flexible couplings in said common drive mechanism between each of said individual power take-offs.

4. In an airplane, a main wing having a series of pockets therein to receive flaps, a series of extendible wing flaps normally fitting into said pockets and fairing into the profile of the main wing, said flaps being substantially aligned and occupying a major portion of the trailing edge of said wing, and driving means for extending and tilting said flaps relative to said wing comprising at least one independently extensible carriage for such flap, guide means carried by said wing for supporting said carriage, and a common drive mechanism for extending and retracting said carriage and flaps, including individual power take-offs and carriage driving means for each of said carriages, and flexible couplings in said common drive mechanism between each of said individual power take-offs.

5. In an airplane, a main wing having a series of pockets therein to receive flaps, a series of extendible wing flaps normally fitting into said pockets and fairing into the profile of the main wing, said flaps being substantially aligned and occupying a major portion of the trailing edge of said wing, and driving means for extending and tilting said flaps relative to said wing comprising a pair of carriages for each flap, guide means carried by said wing for supporting said carriages, a common drive mechanism for extending and retracting one of each of said pairs of carriages for each flap, including individual power take-offs and carriage driving means for one of each pair of said carriages, and flexible couplings in said common drive mechanism between each of said individual power take-offs.

6. In an airplane, a main wing divided into a series of panels having pockets therein to accommodate flaps, a series of extendible wing flaps normally nesting in said pockets, flap carriages rearwardly and downwardly guided internally of said wings, at least two carriages being provided for each flap, a common drive for one carriage for each flap, means for driving the remaining carriages for each flap from the carriage driven by said common drive, and frangible connections between the common drive and the carriages driven thereby whereby to isolate a damaged flap from the common drive.

7. In an airplane, a main wing divided into a series of panels having pockets therein to accommodate flaps, a series of extendible wing flaps normally nesting in said pockets, flap carriages rearwardly and downwardly guided internally of said wings, at least two carriages being provided for each flap, a common drive for one carriage for each flap, means for driving the remaining carriages for each flap from the carriage driven by said common drive, and flexible couplings in said common drive between the carriage drives therefrom whereby successive flap carriages will be progressively energized upon starting the common drive.

8. In an airplane, a main wing divided into a series of panels having pockets therein to accommodate flaps, a series of extendible wing flaps normally nesting in said pockets, flap carriages rearwardly and downwardly guided internally of said wings, at least two carriages being provided for each flap, a common drive for one carriage for each flap, means for driving the remaining carriages for each flap from the carriage driven by said common drive, frangible connections between the common drive and the carriages driven thereby whereby to isolate a damaged flap from the common drive, and flexible couplings in said common drive between the carriage drives therefrom whereby successive flap carriages will be progressively energized upon starting the common drive.

9. In an airplane, a main wing divided into a series of panels having pockets therein to accommodate flaps, a series of extendible wing flaps normally nesting in said pockets, flap carriages rearwardly and downwardly guided internally of said wings, at least two carriages being provided for each flap, a common drive for one carriage for each flap, and means for driving the remaining carriages for each flap from the carriage driven by said common drive.

10. In an airplane, a main wing having pockets therein to receive extendible flaps, extendible flaps normally nestable in said pockets to fair into the profile of said main wing, box ribs in said main wing forming guideways, carriages movable in said box ribs and connected to said flaps for extending and retracting the latter, means mounted in said box ribs to support and guide the carriages therein, rotatable threaded shafts for projecting and retracting said carriages, nuts carried by said carriages for engaging said shafts, torsion stops associated with said shafts and nuts to prevent jamming of the shafts and nuts at either extreme of the carriage motion, and driving means for said shafts including a common drive for all flaps and frangible connections between individual driven shafts and said common drive.

11. In an airplane, a main wing having pockets therein to receive extendible flaps, extendible flaps normally nestable in said pockets to fair into the profile of said main wing, box ribs in said main wing forming guideways, carriages movable in said box ribs and connected to said flaps for extending and retracting the latter, means mounted in said box ribs to support and guide the carriages therein, rotatable threaded shafts for projecting and retracting said carriages, nuts carried by said carriages for engaging said shafts, torsion stops associated with said shafts and nuts to prevent jamming of the shafts and nuts at either extreme of the carriage motion, each flap being provided with at least two carriages and shafts, means for driving one of the two carriage shafts from the other, and a common drive for the latter shafts of each flap.

12. In an airplane, a main wing having pockets therein to receive extendible flaps, extendible flaps normally nestable in said pockets to fair into the profile of said main wing, box ribs in said main wing forming guideways, carriages movable in said box ribs and connected to said flaps for extending and retracting the latter, means mounted in said box ribs to support and guide the carriages therein, rotatable threaded shafts for projecting and retracting said carriages, nuts carried by said carriages for engaging said shafts, torsion stops associated with said shafts and nuts to prevent jamming of the shafts and nuts at either extreme of the carriage motion, each flap being provided with at least two carriages and shafts, means for driving one of the two carriage shafts from the other, a common drive for the latter shafts of each flap, and frangible connections between the latter shafts and the common drive, whereby to isolate a damaged flap from the common drive.

FELIX W. A. KNOLL.

REFERENCES CITED

The following references are of record in the file of this patent:

UNITED STATES PATENTS

| Number | Name | Date |
| --- | --- | --- |
| 2,295,306 | Tampier | Sept. 8, 1942 |
| 2,202,430 | Rebeski | May 28, 1940 |
| 1,846,965 | Hall | Feb. 23, 1932 |
| 2,070,006 | Eaton et al. | Feb. 9, 1937 |
| 2,127,864 | Girard | Aug. 23, 1928 |
| 2,348,150 | Richter | May 2, 1944 |

FOREIGN PATENTS

| Number | Country | Date |
| --- | --- | --- |
| 701,980 | Germany | Jan. 28, 1941 |
| 514,157 | Great Britain | Nov. 1, 1939 |
| 506,714 | Great Britain | June 2, 1939 |